United States Patent [19]
Gulezian et al.

[11] Patent Number: 4,675,903
[45] Date of Patent: Jun. 23, 1987

[54] TELEPHONE HANDSET ASSEMBLY

[75] Inventors: Haig A. Gulezian, Windham, N.H.; Russell W. Hargrave, III, Groton; William E. Magro, Methuen, both of Mass.

[73] Assignee: Wang Laboratories, Inc., Lowell, Mass.

[21] Appl. No.: 893,465

[22] Filed: Aug. 8, 1986

Related U.S. Application Data

[63] Continuation of Ser. No. 626,010, Jun. 29, 1984, abandoned.

[51] Int. Cl.$^4$ ............................................. H04M 1/03
[52] U.S. Cl. ..................................... 379/433; 379/429
[58] Field of Search ..................... 179/178, 179, 100 D, 179/100 R, 103, 159, 186, 167, 185; 339/125 R, 126 R, 59 R, 217 S; 379/428, 429, 433, 434

[56] References Cited

U.S. PATENT DOCUMENTS

| | | | |
|---|---|---|---|
| 2,322,851 | 6/1943 | Kalb | 179/159 |
| 3,235,674 | 2/1966 | Mirstam | 179/103 |
| 3,243,527 | 3/1966 | Sternheim | 179/185 |
| 4,124,785 | 11/1978 | Seretny et al. | 179/103 |
| 4,163,875 | 8/1979 | Cogan | 179/103 |
| 4,237,350 | 12/1980 | Ruzic | 179/103 |
| 4,284,855 | 8/1981 | Adams et al. | 179/100 C |
| 4,291,202 | 9/1981 | Adams et al. | 179/103 |
| 4,319,095 | 3/1982 | Cogan | 179/103 |
| 4,456,794 | 6/1984 | Strömer et al. | 179/103 |
| 4,594,478 | 6/1986 | Gumb et al. | 179/103 |
| 4,636,591 | 1/1987 | Kuhfus et al. | 381/159 |

FOREIGN PATENT DOCUMENTS

| | | | |
|---|---|---|---|
| 1214735 | 4/1966 | Fed. Rep. of Germany | 179/159 |
| 1180080 | 2/1970 | United Kingdom | 179/179 |

Primary Examiner—Gene Z. Rubinson
Assistant Examiner—R. Vaas
Attorney, Agent, or Firm—Michael H. Shanahan; Kenneth L. Milik

[57] ABSTRACT

The generally rectangular cross section of a telephone handset handle extends through a microphone portion of the handset. The microphone portion is angled about 38 degrees from the handle. The handle has a width of about 1.5 inches and a depth of about 0.7 inch to meet the requirements of 98% of the user population. A speaker portion, angled about 15 degrees from the handle, has a concave depression to be seated against a user's ear. The distance between the center of the speaker depression and the microphone cavity is about 5.8 inches. The microphone portion is about two inches long and has grooves extending to its end. Baffles extend across the hollow of the handle to acoustically isolate the speaker and microphone portions of the handset. To facilitate assembly, the connector and microphone are first fixed to a holder without the need for adhesive or additional fasteners. The speaker and holder are then positioned in a base section of the handset without the need for adhesive or additional fasteners. The holder may restrain a magnet element. A top section of the handset is secured under a lip at one end and by a spring clip at the other end.

1 Claim, 10 Drawing Figures

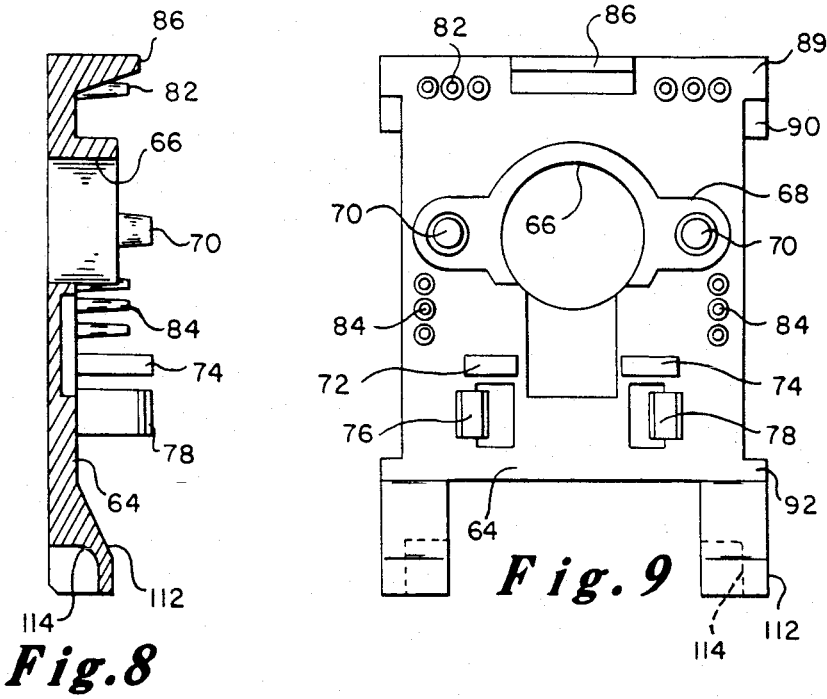
Fig. 8
Fig. 9
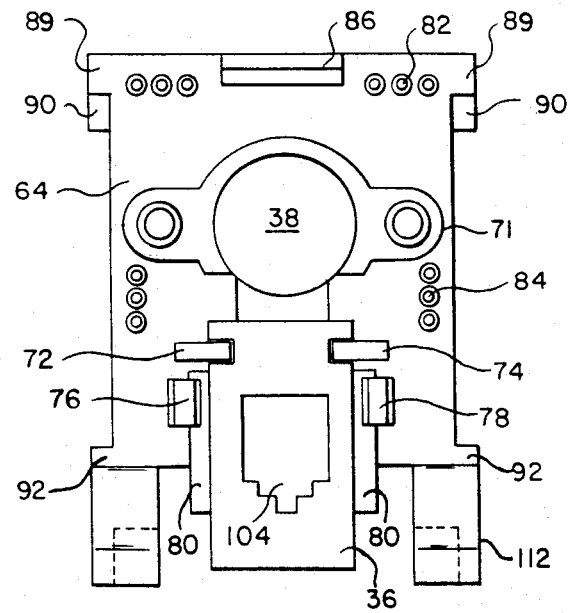
Fig. 10

TELEPHONE HANDSET ASSEMBLY

This is a continuation of application Ser. No. 626,010, filed June 29, 1984, now abandoned.

DESCRIPTION

Technical Field

This invention relates to an ergonomically designed telephone handset which additionally provides improved acoustic coupling of the handset speaker to the user's ear and improved manufacturability.

BACKGROUND

Telephone handsets typically include microphone and speaker portions at each end of a handle portion, the speaker portion is generally a bulb having a concavity therein which fits over the ear. An electromagnetic speaker fits in the speaker bulb and an electromagnetic microphone fits in the microphone portion. Both are connected through a connector to the telephone set. Since telephone handsets are produced in such large volume, it is important that they be designed for ease of assembly at low cost without degrading the quality of the units.

DISCLOSURE OF THE INVENTION

In accordance with certain principles of this invention, to ease assembly of the telephone handset, a microphone and a connector are first interference and snap fit onto a holder. The connector is placed in electrical communication with the microphone on the holder and a separate speaker through electrical leads. The speaker and holder are then positioned in a base section of the telephone handset without adhesive or separate fastener. A top section is then fastened over the base section to enclose the speaker, microphone and connector.

To acoustically isolate the speaker portion from the microphone portion, baffles are provided across the hollow of the handle portion. The speaker is firmly seated with a gasket between the speaker element and the interior of the speaker portion. An acoustically transparent fabric spans the opening in the gasket.

BRIEF DESCRIPTION OF THE DRAWINGS

The foregoing and other objects, features and advantages of the invention will be apparent from the following more particular description of a preferred embodiment of the invention, as illustrated in the accompanying drawings in which like reference characters refer to the same parts throughout the different views. The drawings are not necessarily to scale, emphasis instead being placed upon illustrating the principles of the invention.

FIG. 8 is a longitudinal sectional view of a microphone/connector holder in the handset of FIG. 3, enlarged;

FIG. 9 is a plan view of the holder of FIG. 8;

FIG. 10 is a plan view similar to FIG. 9 but with the connector positioned on the holder.

DESCRIPTION OF A PREFERRED EMBODIMENT

Figure 1:
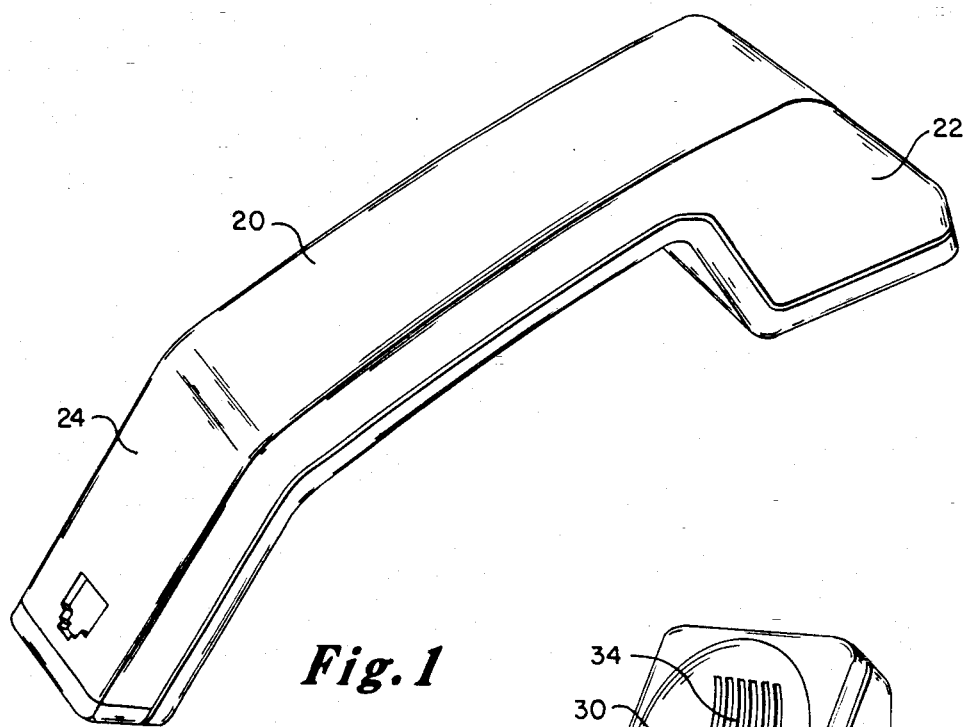
FIG. 1 is a perspective view from the top of a telephone handset embodying the present invention.
Figure 2:
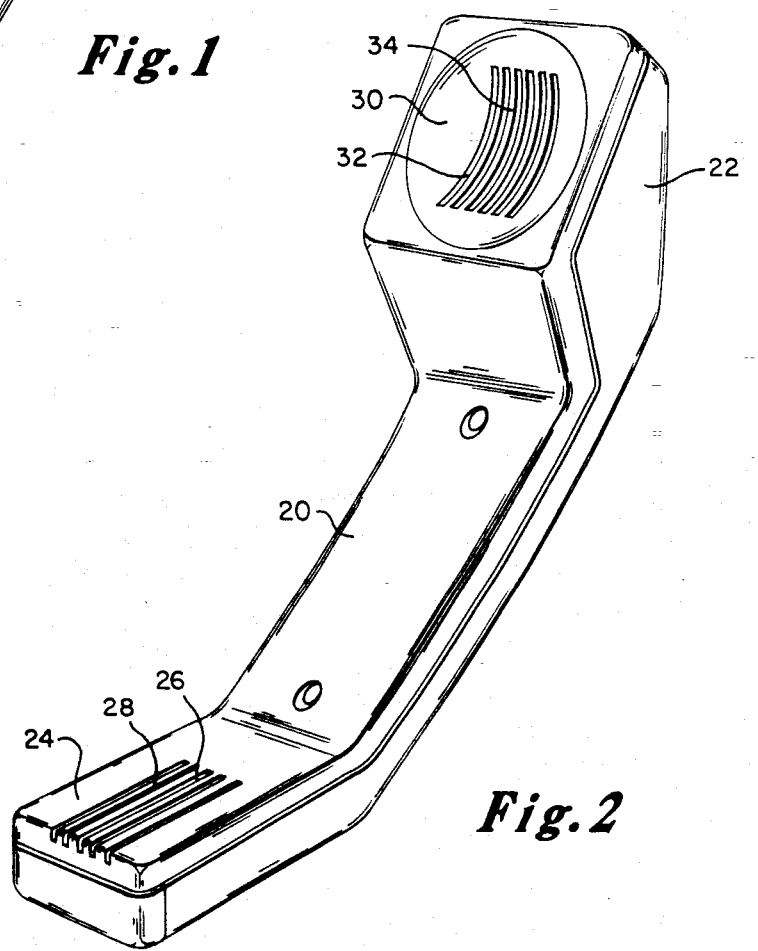
FIG. 2 is a perspective view of the base of the telephone handset of FIG. 1.
Figure 3:
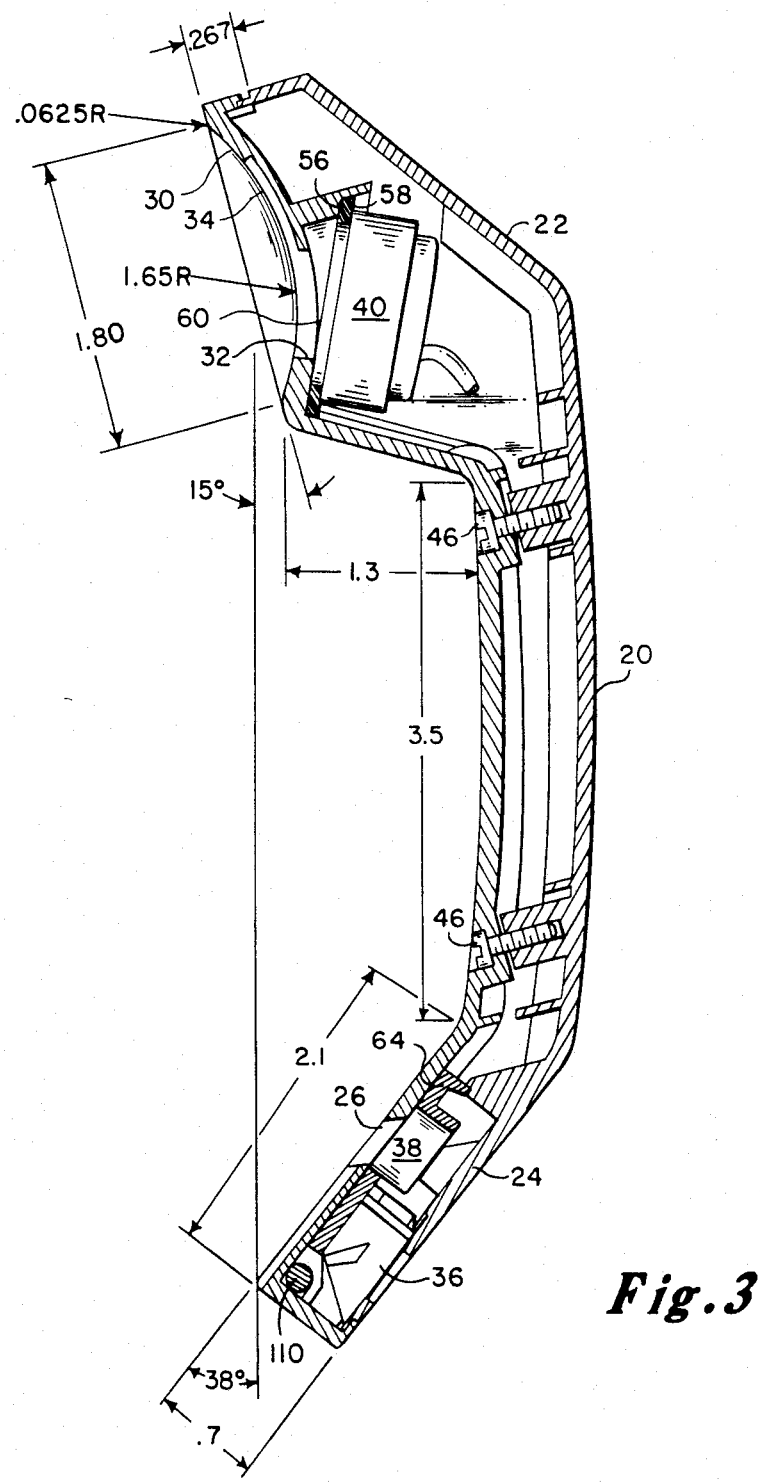
FIG. 3 is a longitudinal cross sectional view of the handset of FIGS. 1 and 2.

A telephone handset embodying principles of the present invention is shown in FIGS. 1, 2 and 3. It includes the typical handle portion 20 between a speaker portion 22 and a microphone portion 24. The handle portion and the microphone portion have the same rectangular cross section. The microphone portion includes a microphone cavity 26 across which ribs 28 extend. The ribs 28 extend beyond the cavity 26 to the end of the microphone portion to add to the aesthetic quality of the handset and further to form grooves which facilitate cleaning of the spaces between the ribs.

The speaker portion is enlarged to provide a concave depression 30 which fits over the user's ear. A speaker cavity 32 is provided in the depression 30 and it is spanned by ribs 34 similar to the ribs 28 of the microphone. The ribs extend beyond the cavity 32 to give the appearance that the speaker is centered in the depression 30.

The dimensions and relative angles of the three portions of the handset have been ergonomically determined to satisfy 98% of the adult male population and 98% of the adult female population. This large user population is facilitated by the common cross section of the handle and microphone portions. A given length handle portion is comfortable with larger hands because there is no interference from the large bowl which surrounds the conventional microphone portion.

Figure 4:
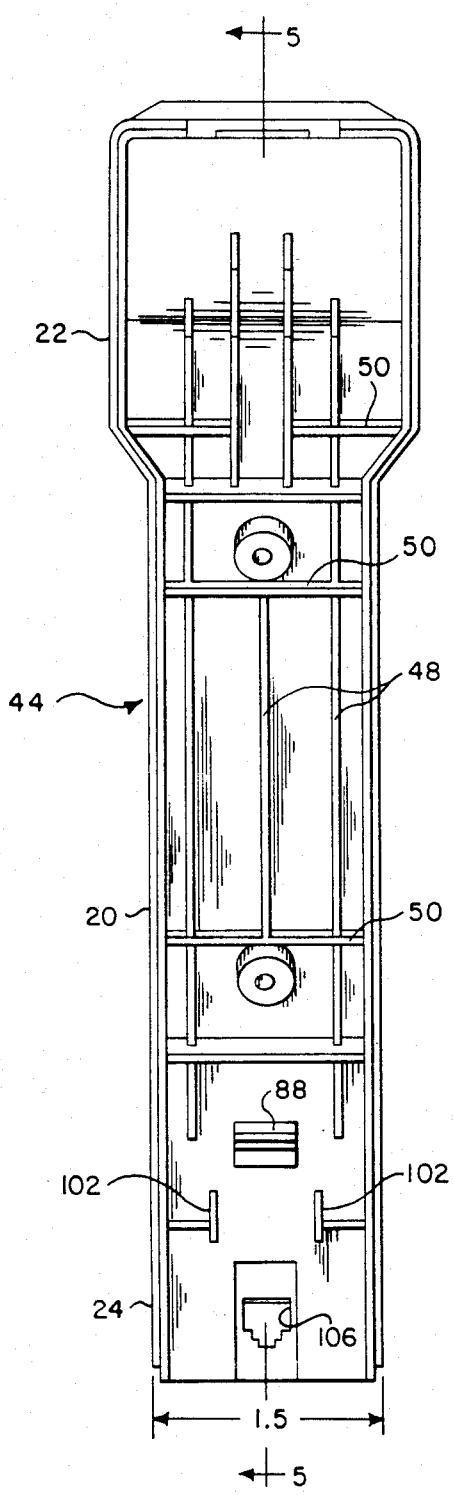
FIG. 4 is a plan view of the interior of the top section of the telephone handset housing.

The handle portion is of generally rectangular cross section with rounded edges. It has been determined that the comfort of the handle is directly related to the width of the handle and its depth. In the preferred embodiment, the width is about 1.5 inches and the depth is about 0.72 inches as shown in FIGS. 4 and 3 respectively. The handle is curved somewhat between the end portions. The handle shown is curved about a 23 inch radius.

To allow the handle to be gripped by a large hand without interference between the hand and face, the plane of the rim of the speaker depression should be displaced from the handle to provide a clearance of over one inch. As shown in FIG. 3, a clearance of 1.3 inches is provided.

With the smaller microphone portion extending smoothly from but angled relative to, the handle portion, it has been found that users tend to draw the microphone end of the handle portion closer to the face. Therefore, the angle that the speaker depression 30 makes with the handle portion has been increased from the conventional 13 degrees to 15 degrees as indicated in FIG. 3. An angle of greater than 17 degrees would cause the handle to be placed too close to the user's cheek if a proper seal were maintained between the ear and the speaker.

The angle of the microphone portion relative to the handle is a function of the handle length. With the preferred handle length of about 3.5 inches, an angle of 38 degrees, shown in FIG. 3, has been found to best position the microphone within the voice cone of the largest user population. The distance between the center of the speaker to the center of the microphone should be between 5.5 inches and 6.0 inches, preferably 5.8 inches. Thus, with increased length, the microphone angle would be increase somewhat. An angle within the range of 35 to 40 degrees is believed best.

It can be seen best from FIG. 3 that the microphone portion extends well beyond the microphone cavity 26. The purpose of that extension is two-fold. First, it provides a convenient space in which to position the connector 36 of the handset and permits that connector to be positioned near the end of the microphone portion. Further, the length of the microphone portion was found important due to ergonomic considerations. Although a very sensitive microphone 38 is used in the handset, and thus need not be positioned directly in front of the user's mouth, the user does not recognize this and attempts to position the microphone directly in front of the mouth. With the extension of the microphone portion to about two inches and with the ribs 28 which extend to the end of the microphone portion, the user has the perception of a microphone positioned directly in front of the mouth even when the microphone is in fact somewhat to the side. Thus, the user does not attempt to angle the handle portion any further in an attempt to speak directly into the microphone.

The acoustic coupling of the speaker 40 to the user's ear for maximum loudness and tone quality is optimized by the dimensions of the speaker depression 30. Rather than the conventional frustoconical depression, the depression 30 is spherical and concave; that is, the depression approximates a portion of a spherical surface. The diameter of the circular rim about the depression 30 is 1.8 inches, somewhat larger than the 1.71 inches of conventional phones. This larger diameter depression has been found to provide a better seal with a larger user population. The edge of the depression is rounded about a radius of 0.0625 inch to provide a comfortable and effective acoustic seal between the speaker portion and the user's ear.

The depth of the depression 30 has been determined, through acoustic testing, to provide the loudest speaker output where a spherical depression is used. To allow proper seating of the speaker portion against the ear and to avoid degradation of the sound from the speaker, that depression should be about 0.267 inch deep.

The detailed construction of the telephone handset can be best understood with reference to FIGS. 3–10. The housing of the handset is formed of a base section 42 shown in FIGS. 6 and 7 and a top section 44 shown in FIGS. 4 and 5. The two are fastened together by screws 46.

Figure 5:
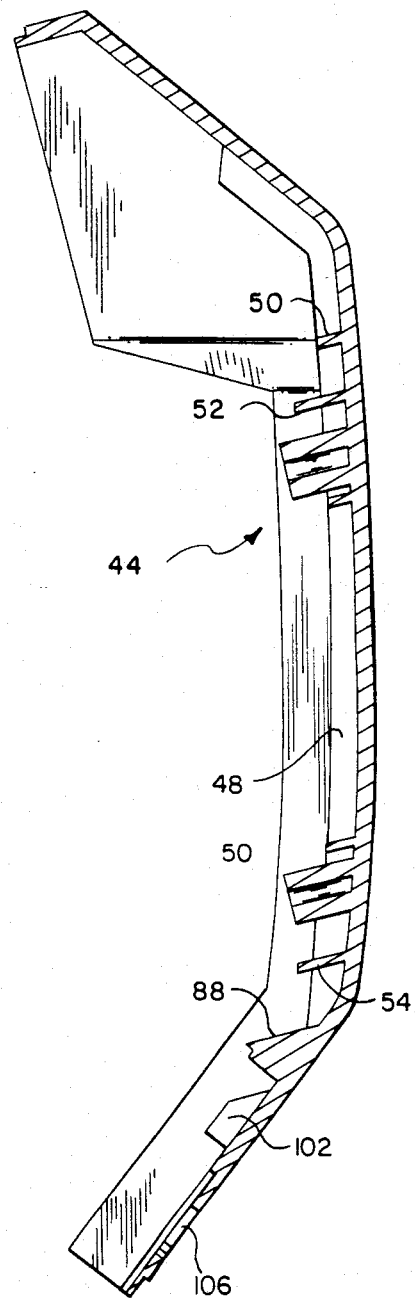
FIG. 5 is a longitudinal sectional view of the section of the housing shown in FIG. 4.

As shown in FIGS. 4 and 5, the top section includes longitudinal ribs 48 and transverse ribs 50 for structural stiffness. Additionally, transverse baffles 52 and 54 extend from the top section across the hollow of the handle portion. Those baffles serve to acoustically isolate the interior of the speaker portion 22 from the interior of the microphone portion 24 of the handset. That isolation minimizes acoustic feedback from the speaker 40 to the microphone 38.

In the speaker portion of the handset, a seat 56 is provided for the speaker element 40. Due to space requirements, the speaker 40 is not positioned coaxially with the depression 30. However, extensions of the ribs 34 beyond the speaker cavity 32 give the appearance of a coaxial speaker.

As shown in FIG. 3, an acoustic seal ring 58 is provided between the speaker 40 and the annular seat 56. That seal minimizes losses from the speaker by assuring that the sound from the speaker travels through the cavity 32 and not into the interior of the speaker portion 22. The seal also allows for manufacturing dimensional tolerances. The space within the seal 58 is spanned by an acoustically transparent fabric 60 which is adhered to the gasket 58 prior to assembly. The fabric 60 helps keep debris from the speaker 40 and also adds to the aesthetic quality of the handset.

Figure 6:
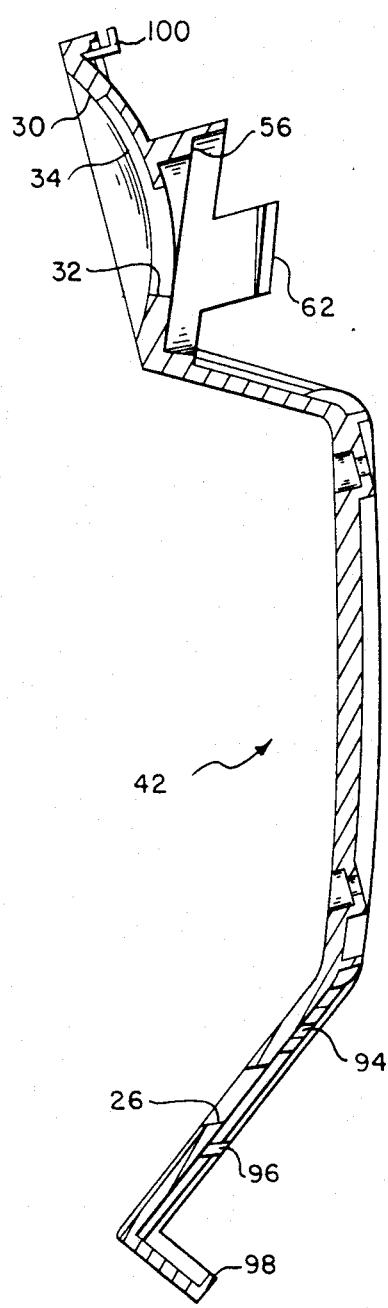
FIG. 6 is a longitudinal sectional view of the base section of the telephone handset.
Figure 7:
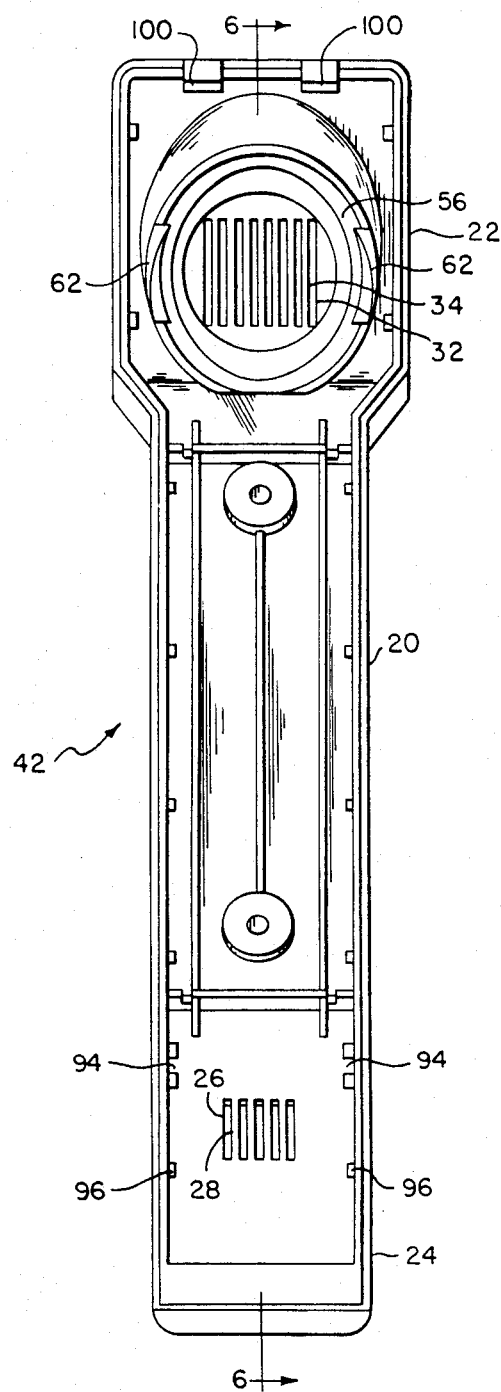
FIG. 7 is a plan view of the base section of FIG. 6.

This speaker is retained against the gasket 58 and seat 56 by a pair of spring fingers 62, one of which is shown in FIG. 6. During assembly, the speaker 40 need only be pressed past the fingers 62 against the gasket 58 on the seat 56.

At the opposite end of the handset, a microphone 38 and connector 36 are contained in the microphone portion. The connector has electrical leads to both the microphone 38 and the speaker 40. To ease top and base section molding requirements and facilitate assembly, the microphone and connector are positioned on a molded holder 64 shown enlarged in FIGS. 8 and 9. The holder includes a center cavity 66 which receives a microphone. The microphone has elastomeric side tabs 71 (FIG. 10) which conform to the platform 68. Pins 70 are interference fit into holes in the elastomeric tabs to retain the microphone on the holder 64. The connector 36, shown in FIG. 10, is pressed against the holder such that ribs 72 and 74 slide into grooves on opposite sides of the connector 36. As the connector is slid down the ribs 72 and 74 firmly against the holder 64, it is grasped by spring clips 76 and 78 about shoulders 80 of the connector.

The connector 36 is coupled to each of the microphone and the speaker through electrical leads. Two sets of pins 82 and 84 are provided to route and retain those leads to facilitate assembly.

A finger 86 extends away from the holder at one end thereof. That finger is retained by a complementary finger 88 in the top section 44 of the handset when the handset is assembled. Side tabs 89 with inclined shoulders 90 are provided at one end of the holder and additional tabs 92 are provided at the other end of the holder. In assembly, after the microphone and connector have been positioned on the holder and the connecting leads have been routed, the speaker 40 is set in the speaker portion of the base 42 as described above, and the holder is set in the microphone portion. The tabs 89 are dropped into slots 94 formed adjacent to the side walls of the base 42, and the tabs 92 are then dropped beyond the tabs 96. The holder thus rests in its proper position in the base 42.

A cylindrical bar magnet 110 is restrained against the base section 42 by arms 112 which extend from the holder 64. The arms 112 have rounded cutaways 114 for receiving the respective ends of the magnet. The magnet can trigger a magnetically actuated switch which may replace the conventional magnetic hookswitch on the telephone set.

The microphone end of the top section 44 is then slid axially under the lip 98 of the base section 42 and the speaker end of the top section 44 is pressed against the base in order that spring clips 100 engage the top section. The assembly is completed by joining the two sectons with the screws 46. The lip 98 provides very secure retention of one end of the top section and, with the uniform width of the microphone portion, allows for ease of alignment of the two sections in that the top section need only be slid in axially over the base section.

When the top section is thus seated on the base section, the retaining finger 88 of the top section presses against the finger 86 on the holder 64. Also, two fingers 102 which run axially along either side of the microphone 38 press against the elastomeric tabs 71 on the microphone to firmly retain the microphone against the holder and the holder against the base section. With the connector properly positioned by the holder 64, a raised section 104 is brought into a complementary hole 106 in the top section 44 for suitable electrical connection of the handset.

The configuration discussed above allows the electrical components of the handset, that is the speaker, the connector and the microphone, to be preassembled into two parts joined by electrical leads. The assembly of the connector and microphone to the holder, which make up one part, can be completed without the use of any adhesives or separate fasteners. Thereafter, the two parts can be properly positioned in the base section, again without the use of adhesive or separate fastener.

While the invention has been particularly shown and described with reference to a preferred embodiment thereof, it will be understood by those skilled in the art that various changes in form and details may be made therein without departing from the spirit and scope of the invention as defined by the appended claims.

We claim:

1. A telephone handset comprising
   a housing formed of a base section and a top section which fasten together to form a hollow enclosure, the housing having a microphone portion, a central handle portion, and a speaker portion;
   said top and base sections having first and second ends, the first end of the top section being positioned within a lip on the first end of the base section and the second end of the top section engaging a spring clip in the second end of the base section;
   speaker within the speaker portion;
   the speaker portion having a molded annular seat on which the speaker is positioned and molded opposing spring fingers integral with the seat for retaining the speaker thereon;
   a microphone, within the microphone portion, having at least one elastomeric tab, the tab having a hole therein;
   a connector within the microphone portion for electrically coupling the speaker and microphone to a telephone line cord, the connector having grooves on opposing sides;
   a holder within the microphone portion for supporting the microphone and connector thereon;
   the holder having a central cavity for receiving the microphone and a pin for engaging the hole in the elastomeric tab to retain the microphone therein;
   the holder having having ribs for engaging the grooves of the connector and spring fingers for retaining the connector thereon; and
   a bar magnet positioned within the microphone portion for triggering a magnetically actuated switch on a telephone set.

* * * * *